United States Patent
Xu et al.

(10) Patent No.: US 10,636,198 B2
(45) Date of Patent: Apr. 28, 2020

(54) SYSTEM AND METHOD FOR MONOCULAR SIMULTANEOUS LOCALIZATION AND MAPPING

(71) Applicants: Beijing Jingdong Shangke Information Technology Co., Ltd., Beijing (CN); JD.com American Technologies Corporation, Mountain View, CA (US)

(72) Inventors: Yi Xu, Menlo Park, CA (US); Shanglin Yang, Sunnyvale, CA (US); Yuzhang Wu, Santa Clara, CA (US); Hui Zhou, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 83 days.

(21) Appl. No.: 15/857,501

(22) Filed: Dec. 28, 2017

(65) Prior Publication Data
US 2019/0206116 A1    Jul. 4, 2019

(51) Int. Cl.
*G06T 15/20* (2011.01)
*G06T 7/60* (2017.01)
(Continued)

(52) U.S. Cl.
CPC ............ *G06T 15/205* (2013.01); *G06T 7/246* (2017.01); *G06T 7/579* (2017.01); *G06T 7/60* (2013.01);
(Continued)

(58) Field of Classification Search
CPC ....... G06T 15/205; G06T 7/579; G06T 7/246; G06T 7/75; G06T 7/60; G06T 2200/04;
(Continued)

(56) References Cited

U.S. PATENT DOCUMENTS 5,790,690 A * 8/1998 Doi .................. G06T 7/0012
382/128
5,850,469 A * 12/1998 Martin ................ G01S 5/163
382/154

(Continued)

OTHER PUBLICATIONS

Liu, Haomin, Guofeng Zhang, and Hujun Bao. "Robust keyframe-based monocular SLAM for augmented reality." 2016 IEEE International Symposium on Mixed and Augmented Reality (ISMAR). IEEE, 2016. 10 pages (Year: 2016).*

(Continued)

*Primary Examiner* — Manav Seth
(74) *Attorney, Agent, or Firm* — China Science Patent & Trademark US LLC

(57) ABSTRACT

A method for simultaneous localization and mapping. The method includes the step of detecting two-dimensional (2D) feature points from a current frame captured by a camera; matching the 2D feature points from the current frame directly to three-dimensional (3D) map points in a 3D map, so as to obtain correspondence between the 2D feature points and the 3D map points; and computing a current pose of the camera based on the obtained correspondence. Each of the 2D feature points and the 3D map points has a feature descriptor. The step of matching is performed by comparing the feature descriptors of the 2D feature points and the feature descriptors of the 3D map points.

18 Claims, 6 Drawing Sheets

(51) Int. Cl.
*G06T 7/246* (2017.01)
*G06T 7/73* (2017.01)
*G06T 7/579* (2017.01)

(52) U.S. Cl.
CPC ............ *G06T 7/75* (2017.01); *G06T 2200/04* (2013.01); *G06T 2207/10028* (2013.01); *G06T 2207/30244* (2013.01)

(58) Field of Classification Search
CPC . G06T 2207/10028; G06T 2207/30244; G06T 7/73; G06T 2207/20081; G06T 2207/20084; G06N 3/04; G06N 3/0454; G06N 3/08; G06N 3/084; G05D 1/0246; G06K 9/00664; G06K 9/6262; G06K 9/6272; G06K 9/6223
See application file for complete search history.

(56) References Cited

U.S. PATENT DOCUMENTS

| | | | | |
|---|---|---|---|---|
| 6,064,749 A * | 5/2000 | Hirota | ...................... | G06F 3/011 345/7 |
| 6,765,569 B2 * | 7/2004 | Neumann | ................. | G06T 7/80 345/419 |
| 7,197,165 B2 * | 3/2007 | Ryan | ...................... | G06F 3/013 382/103 |
| 7,545,965 B2 * | 6/2009 | Suzuki | ................... | G06T 5/007 382/128 |
| 7,831,094 B2 * | 11/2010 | Gupta | ............... | G06K 9/00201 382/103 |
| 7,868,772 B2 * | 1/2011 | Chao | ................... | G08B 17/125 340/573.6 |
| 7,925,049 B2 * | 4/2011 | Zhu | ......................... | G06K 9/32 382/103 |
| 8,442,305 B2 * | 5/2013 | Ramalingam | ...... | G01C 21/3602 382/154 |
| 8,452,080 B2 * | 5/2013 | Engedal | ............... | H04N 13/204 382/154 |
| 8,761,439 B1 * | 6/2014 | Kumar | ...................... | G06T 7/73 382/103 |
| 8,798,357 B2 * | 8/2014 | Sinha | ................. | G06K 9/00664 345/419 |
| 9,008,440 B2 * | 4/2015 | Kim | ......................... | G06K 9/00 382/199 |
| 10,062,010 B2 * | 8/2018 | Kutliroff | .............. | G06K 9/6272 |
| 2009/0324087 A1 * | 12/2009 | Kletter | ................. | G06K 9/4671 382/195 |
| 2010/0188396 A1 * | 7/2010 | Mejdrich | ................ | G06T 15/06 345/419 |
| 2011/0150319 A1 * | 6/2011 | Ramalingam | ...... | G01C 21/3602 382/153 |
| 2011/0286631 A1 * | 11/2011 | Wagner | .................... | G06K 9/32 382/103 |
| 2012/0306850 A1 * | 12/2012 | Balan | .................... | G09G 3/003 345/419 |
| 2016/0379092 A1 * | 12/2016 | Kutliroff | ................. | G06N 3/04 382/158 |

OTHER PUBLICATIONS

Mur-Artal, Raúl, and Juan D. Tardós. "Visual-inertial monocular SLAM with map reuse." IEEE Robotics and Automation Letters 2.2 (2017): 796-803. 8 pages (Year: 2017).*

R. Mur-Artal, J. M. M. Montiel and J. D. Tardós, ORB-SLAM: a versatile and accurate monocular SLAM System, IEEE Transactions on Robotics, Oct. 2015, 1147-1163, vol. 31, No. 5.

Tong Qin, Peiliang Li, Zhenfei Yang, Shaojie Shen, VINS-Mono: A robust and versatile monocular visual-nertial state estimator, Aug. 2017, 1-17, arXiv:1708.03852.

* cited by examiner

SYSTEM AND METHOD FOR MONOCULAR SIMULTANEOUS LOCALIZATION AND MAPPING

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to the field of image processing, and more particularly to systems and methods for monocular simultaneous localization and mapping.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

A simultaneous localization and mapping (SLAM) solution using a single camera, also referred to as monocular SLAM, may be used for simultaneously constructing and updating a three-dimensional (3D) map for an environment where the camera is located while keeping track of a pose, including both a position and an orientation, of the camera with regard to the environment. Normally, the 3D map may consist of a set of 3D points that represent the environment. However, it is challenging to relate the points in the frames collected by the single camera and the points in the 3D map accurately.

Therefore, an unaddressed need exists in the art to address the aforementioned deficiencies and inadequacies.

SUMMARY OF THE INVENTION

In certain aspects, the present invention relates to a method for simultaneous localization and mapping. In certain embodiments, the method includes the steps of: detecting two-dimensional (2D) feature points from a current frame captured by a camera; matching the 2D feature points from the current frame directly to three-dimensional (3D) map points in a 3D map, so as to obtain correspondence between the 2D feature points and the 3D map points; and computing a current pose of the camera based on the obtained correspondence. Each of the 2D feature points and the 3D map points has a feature descriptor, and the matching is performed by comparing the feature descriptors of the 2D feature points and the feature descriptors of the 3D map points.

In certain embodiments, the method further includes, in response to determining that the current frame qualifies as a key frame: reconstructing new 3D map points based on the current frame; and incorporating the new 3D map points to the 3D map.

In certain embodiments, the current frame is determined to qualify as a key frame when a percentage of 2D feature points of the current frame that have been matched to the 3D map points is below a predetermined threshold. In certain embodiments, the predetermined threshold is about 30%.

In certain embodiments, the method further includes, in response to determining that the current frame qualifies as a key frame: respectively increasing ages of the 3D map points in the updated 3D map by 1.

In certain embodiments, the matching is performed on at least a part of the 3D map points whose ages are less than a predetermined threshold.

In certain embodiments, the method further includes rendering a virtual object on the 3D map based on the current frame.

In certain embodiments, the method further includes: removing 3D map points whose ages are more than a predetermined threshold. In certain embodiments, the age is in a range of 2-100. In certain embodiments, the age is in a range of 5-20. In certain embodiments, the age is about 5 or 10.

In certain embodiments, the method further includes: selecting a pair of frames from a sequence of frames captured by the camera based on predetermined criteria; and constructing an initial 3D map by: matching 2D feature points from the pair of frames to obtain 2D feature points correspondence, recovering relative rotation and translation of the camera based on the 2D feature points correspondence, and triangulating the corresponding pairs of 2D feature points to obtain the initial 3D map points.

In certain embodiments, the method further includes computing the current pose of the camera based on data obtained from at least one of: an accelerometer; a gyroscope; and an inertial measurement unit (IMU).

In certain embodiments, the method further includes optimizing the current pose of the camera by bundle adjustment.

In certain embodiments, each of the feature descriptors of the 2D feature points and 3D map points comprises a vector or a histogram of corresponding one of the 2D feature points and 3D map points.

In certain aspects, the present invention relates to a method for simultaneous localization and mapping. The method includes detecting 2D feature points from a current frame captured by a camera; matching feature descriptors of the detected feature points from the current frame to feature descriptors of the feature points in a plurality of previous frames; obtaining correspondences between the 2D feature points and 3D map points based on the matching result and correspondences between the feature descriptors of the 2D feature points of the plurality of previous frames and the 3D map points; and computing a current pose of the camera based on the obtained correspondence.

In certain embodiments, the matching further includes: matching the feature descriptors of the detected feature points from the current frame to an "average", or "combined", or "concatenated" of the 2D feature descriptors of the corresponding feature points from a plurality of previous frames.

In certain aspects, the present invention relates to a device for simultaneous localization and mapping. The device includes a camera, at least one processor, and a memory including computer executable codes or instructions. The instructions, when being executed in the at least one processor, is configured to: detect two-dimensional (2D) feature points from a current frame captured by the camera; match the 2D feature points from the current frame directly to three-dimensional (3D) map points in a 3D map, so as to obtain correspondence between the 2D feature points and the 3D map points; and compute a current pose of the camera based on the obtained correspondence. Each of the 2D feature points and the 3D map points has a feature descriptor, and the matching is performed by comparing the feature descriptors of the 2D feature points and the feature descriptors of the 3D map points.

In certain embodiments, the executed instruction is further configured to, in response to determining that the current frame qualifies as a key frame: reconstruct new 3D map points based on the current; and incorporate the new 3D map points to the 3D map.

In certain embodiments, the executed instruction is further configured to: determine that the current frame qualifies as a key frame when a percentage of 2D feature points of the current frame that have been matched to the 3D map points is below about 30%.

In certain embodiments, the executed instruction is further configured to, in response to determining that the current frame qualifies as a key frame: respectively increase ages of the 3D map points in the updated 3D map by 1; and remove 3D map points whose ages are more than a predetermined threshold.

In certain embodiments, the executed instruction is further configured to: select a pair of frames from a sequence of frames captured by the camera based on predetermined criteria; and construct an initial 3D map by: matching 2D feature points from one of the pair of frames with 2D feature points from another one of the pair of frames to obtain 2D feature points correspondence, recovering relative rotation and translation of the camera based on the 2D feature points correspondence, and triangulating the corresponding pairs of 2D feature points to obtain initial 3D map points.

In certain embodiments, each of the feature descriptors of the 2D feature points and 3D map points comprises a vector or a histogram of corresponding one of the 2D feature points and 3D map points.

In certain embodiments, the executed instruction is further configured to: optimize the current pose of the camera by bundle adjustment.

In another aspect, the present invention is directed to an augmented reality (AR) system, including the device as described previously.

In another aspect, the present invention is directed to a computer readable medium which stores computer program including instructions which, when executed on at least one processor, cause the at least one processor to perform the method as described previously.

These and other aspects of the present invention will become apparent from the following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION OF THE INVENTION

Figure 1:
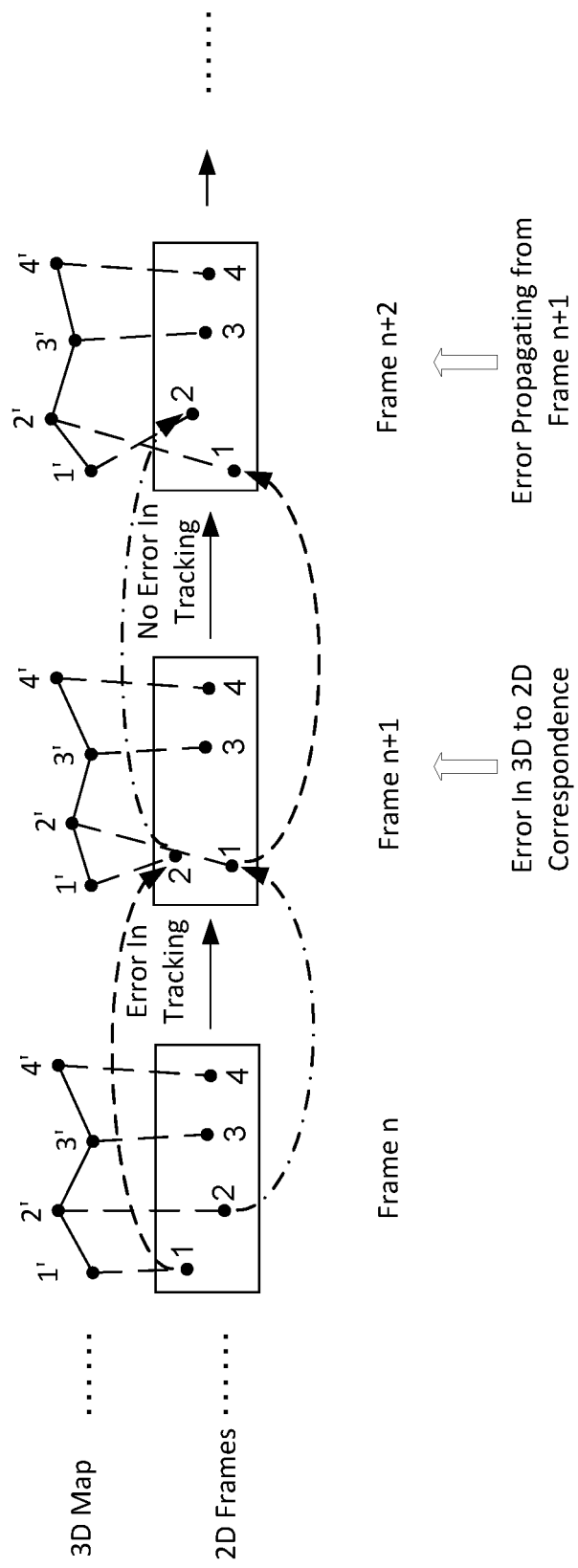
FIG. 1 schematically depicts a SLAM solution according to certain embodiments of the present invention, where error propagating exists.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention may be implemented by computer systems. As depicted in the drawings, computer components may include physical hardware components and virtual software components. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

In certain aspects, the present invention relates to several types of SLAM solutions, such as oriented FAST and rotate BRIEF SLAM (ORB-SLAM), monocular visual-inertial system (VINS-Mono) etc. In both ORB-SLAM and VINS-Mono, features of the two-dimensional (2D) feature points from the current frame are respectively matched with those from one of the previous frames (preferably, a frame immediately previous to the current frame); and then, correspondences between the 3D map points of the 3D map and the feature points from the current frame may be obtained based on the result of the feature matching between the current frame and the previous frame. Therefore, the correspondences between the 3D map points of the 3D map and the feature points from the current frame are significantly dependent on the correspondences between the 3D map points of the 3D map and the feature points from the previous frame.

In certain embodiments, tracking error may happen and propagate. FIG. 1 shows a SLAM solution, in which an error in the correspondences between the 3D map points of the 3D map and the feature points from one frame propagates to the next frame. As shown in FIG. 1, a correspondence between the feature points 1, 2, 3 and 4 of frame n and the feature points 1', 2', 3', and 4' of the 3D map is established. When frame n+1 is obtained, the methods first determines feature points correspondence between frame n and frame n+1. Based on the feature points correspondence between the frame n and frame n+1, and the feature points correspondence between the frame n and the 3D map, the correspondence between the frame n+1 and the 3D map can be induced. As shown in FIG. 1, due to error in tracking, the feature points 2 and 1 in frame n+1 correspond to the feature point 1 and 2 in frame n respectively. Consequently, the induced correspondence between frame n+1 and the 3D map is also incorrect, that is, the feature points 2 and 1 in frame n+1 correspond to the feature point 1 and 2 in the 3D map respectively. When a new frame n+2 is obtained, suppose there is no tracking error between frame n+2 and frame n+1, that is, the feature points 2 and 1 of frame n+2 correspond to the feature points 2 and 1, of frame n+1. Consequently, the feature points 2 and 1 of frame n+1 correspond to the feature points 1 and 2 of frame n, and the feature points 1 and 2 of the frame n correspond to the feature point 1 and 2 of the 3D map. As a result, the feature points 2 and 1 of frame n+2 correspond to the feature points 1 and 2 of the 3D map. Under this situation, once a tracking error occurred as shown in frame n+1, it is hard to correct the error in the subsequent frames. The above procedure thus disadvantageously affects accuracy of the SLAM solution.

Figure 2:
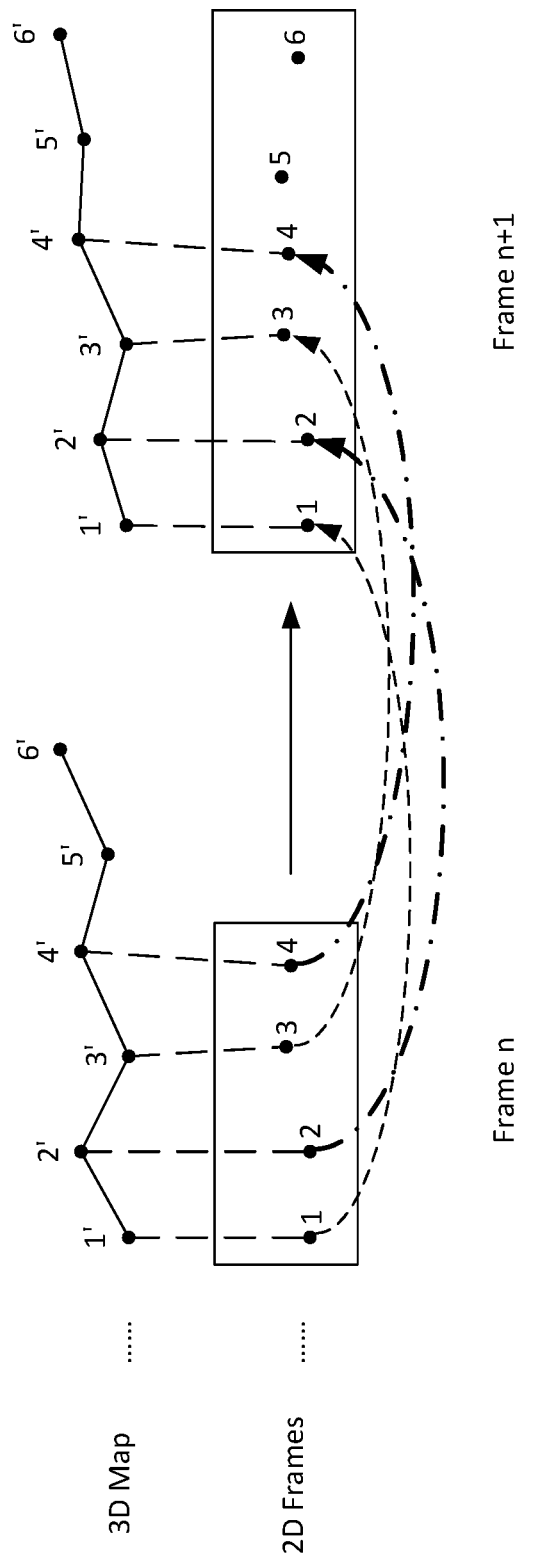
FIG. 2 schematically depicts another SLAM solution according to certain embodiments of the present invention.

In addition, since the correspondence between the feature points of the 3D map and the feature points from the current frame depends on the correspondence between the feature points of the 3D map and the feature points from the previous frame, the feature points from the current frame for matching are limited to the feature points from the previous frame. Thus, no additional feature points from the current frame can be matched with their corresponding feature points in the 3D map. Specifically, as shown in FIG. 2, in certain SLAM solution, frame n has feature points 1, 2, 3 and 4, which correspond to feature points 1', 2', 3', and 4' of the 3D map. When a new frame n+1 is obtained, the new frame n+1 has feature points 1, 2, 3, 4, 5, and 6. Since frame n only has 4 feature points, only feature points 1, 2, 3, and 4 of the frame n+1 can find correspondence in the frame n. As a result, the system finds correspondence between the feature points 1, 2, 3, and 4 from the frame n+1 and the feature points 1, 2, 3, and 4 of the 3D map. There is no pathway to find the correspondence between the feature points 5 and 6 in the frame n+1 and the feature points 5 and 6 in the 3D map because the intermediate frame n does not include feature points 5 and 6. In other words, although there are more feature points (5, 6) from the current frame (frame n+1), these feature points (5, 6) cannot find their correspondences with the 3D map points, since the correspondences between the 3D map points and the feature points from the current frame are obtained based on the correspondences between the 3D map points and the feature points from the previous frame n.

In certain aspects, the present invention provides an improved SLAM solution to overcome the above discussed disadvantages. In certain embodiments, the solution directly matches feature points in a current 2D frame to the feature points in the 3D map, independent of the correspondences between the feature points of the 3D map and the feature points from any of the previous frames. Further, the solution optimizes pose of the camera by bundle adjustment (BA) using each captured frame instead of only using key frames, so as to improve the accuracy of pose estimation of the camera. Here key frames are frames selected from a sequence of frames captured by the camera that have more feature points and have high quality for estimating the pose of the camera.

In certain embodiments, the improved SLAM method includes component s of initialization, tracking, mapping, and re-localization. For initialization, a pair of images are chosen from the captured image sequence based on a score that favors large visual parallax and avoids pure planar structure. From the pair of input images, SfM is used to reconstruct an initial structure. More specifically, firstly the ORB features from the pair of images are matched. Then, the relative camera rotation and translation are recovered from the corresponding points in two images. With the relative transformation between the two frames, all the corresponding points are triangulated to obtain 3D map points.

For tracking, instead of tracking from frame to frame, the method matches 2D features from the current frame directly to the 3D map points in the current reconstructed structure. This is one of the distinct features of the method according to certain embodiments of the present invention. For each reconstructed 3D map point, a feature descriptor (e.g., ORB descriptor) is stored. When a new 3D map point is reconstructed using triangulation, the ORB feature descriptor from one of the two frames is used as the 3D map point's descriptor. Later on, when the same 3D point is seen again, its feature descriptor can be updated using data from the most recent frame. The advantage of the method is that it offers the opportunity to match more features beyond just those in the previous frame because not all the 3D map points are visible in the previous frame. Then, given the 3D point to 2D feature correspondences, an initial camera pose is computed using the Perspective-n-Point algorithm.

Similar to ORB-SLAM and VINS-mono, the camera pose is further optimized using Bundle Adjustment (BA) optimization on the sliding window. BA is a non-linear optimization approach that optimizes the 3D map points' locations and camera's poses all together by minimizing the reprojection errors of the 3D map points on the camera view planes. ORB-SLAM and VINS-Mono perform BA whenever there is a new key frame so as to correct pose tracking error at regular or irregular intervals. In contrast, the method according to certain embodiments of the present invention optimizes camera pose on every frame regardless whether it is a key frame or not. In this way, the method produces optimized pose for each frame, and thus increases the temporal smoothness of camera pose estimation.

For mapping, once the method decides that a frame should be added to the set of key frames, new 3D map points can be created using the new key frame and a best image from the sliding window of frames. The best image may be selected using the same criteria used in initialization step. New points are triangulated and added to the 3D map. In certain embodiments, the age of all 3D map points is also increased by 1. In this way, it is possible to remove points that are older than a certain age in order to keep the memory footprint under control.

When camera moves too fast, mapping and tracking becomes unstable, and re-localization is required. Since descriptors for 3D map points are stored, re-localization is supported by simply matching features in the new frame to 3D map points' feature descriptors.

Figure 3:
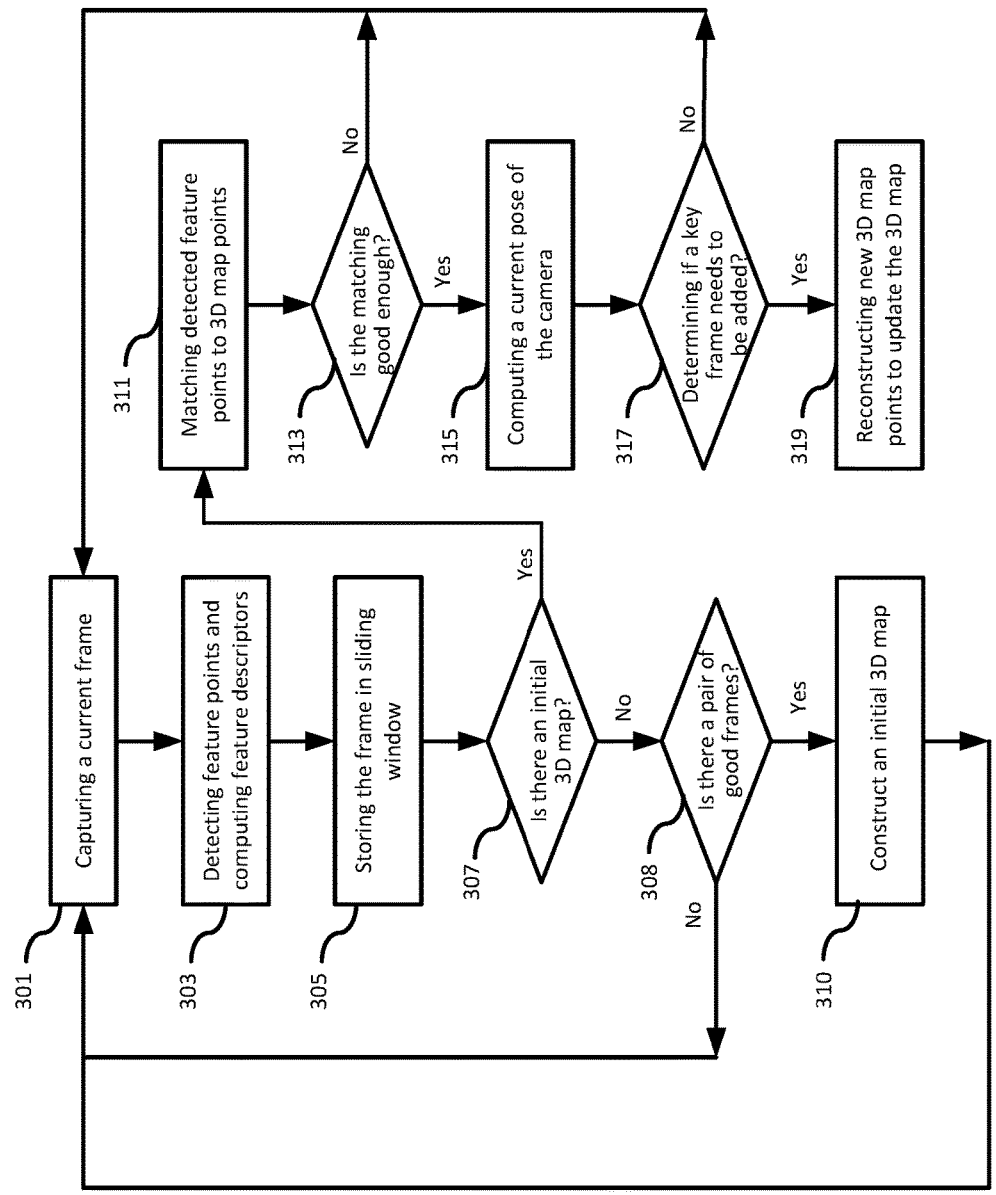
FIG. 3 schematically depicts a flowchart of a method for SLAM according to certain embodiments of the present invention.
Figure 6:
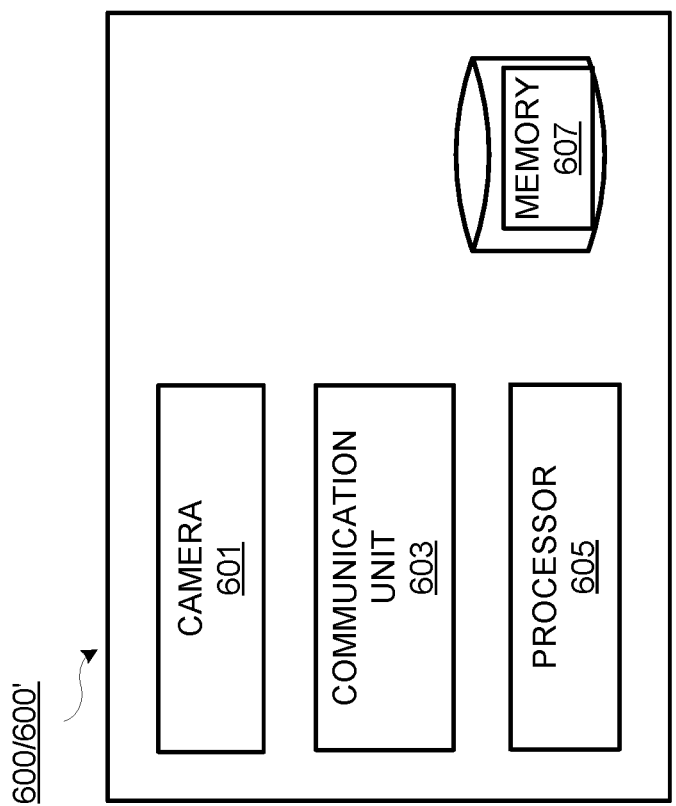
FIG. 6 schematically depicts a system of a SLAM solution according to certain embodiments of the present invention.

FIG. 3 illustratively shows a flowchart of a method 300 for SLAM according to certain embodiment of the present invention, which may be performed at a device capable of SLAM, such as the device as shown in FIG. 6. In certain embodiments, the device includes a processor, a memory and a storage, where the processor is configured to control operation of the device, the memory can be a volatile memory for storing data and information during the operation of the device, and the storage may be a non-volatile memory for storing computer executable codes or instructions. The code, when executed at the processor, is configured to perform the method 300. The device may be part of a robot, an augmented reality (AR) device, a mixed reality (MR) device, or a virtual reality (VR) device. It should be particularly noted that, unless otherwise stated in the present invention, the steps of the method may be arranged in a different sequential order, and are thus not limited to the sequential order as shown in FIG. 3.

As shown in FIG. 3, in step 301, when a device moves in an environment, a camera of the device captures a frame.

After obtaining the frame, in step 303, a processor of the device processes the frame to obtain feature points, and computes feature descriptor for each feature points. The feature points may be obtained based on their respective characteristics. For example, each feature point may be located at a corner, or an edge. The feature point is calculated to obtain a feature descriptor. The descriptor may be a general information descriptor that represents color, shape, regions, textures and motion of the feature point, or a specific domain information descriptor that represents objects and events in the scene. In certain embodiments, the feature descriptor is calculated as a vector or a histogram. The descriptor for each feature point not only includes the information of that pixel, but also information of certain other pixels around the feature point. In certain embodiments, the feature point may include more than one pixel. In certain embodiments, the feature descriptors are ORB feature descriptors.

In step 305, the frame, the feature points, and the associated feature descriptors are stored in a buffer. If the buffer has more images than a pre-defined threshold, the oldest image is discarded. This buffer is also referred to as sliding window. In certain embodiments, the pre-defined threshold may be 4-100. In certain embodiments, the pre-defined threshold is 10-40. In one embodiment, the pre-defined threshold is 20.

In step 307, the device determines if there is already an initialized 3D map of the environment. If "no," the method 300 proceeds to step 308 to build an initial 3D map, if "yes," the method 300 proceeds to step 311 for tracking.

When there is no initial 3D map available, at step 308, the device determines whether there are a pair of good images (frames) from the sliding window. The quality of the pair of images are evaluated by certain predetermined criteria. For example, a pair of images that having more feature points are favorable. In certain embodiments, a sequence of images in the sliding window are scored using visual parallax feature, planar feature, etc., and a pair of images having a high score, i.e., having images with large visual parallax and without pure planar structure, are selected to construct the initial 3D map.

In certain embodiments, when the sliding window doesn't have a pair of good images, the step 308 proceeds to step 301 to collect more images. In certain embodiments, the camera captures frames continuously, and when the determination in step 308 is "No," the device may not do anything as a response, but wait for a subsequent frame.

When the sliding window contains a pair of good images, the step 308 proceeds to step 310 to construct the initial 3D map. In certain embodiments, the device uses Structure from Motion (SfM) to reconstruct the initial 3D map of the environment based on the selected pair of frames. In certain embodiments, the device matches 2D features of feature points from the selected pair of frames, recovers relative camera rotation and translation from the corresponding feature points in the pair of frames, and then triangulates the corresponding feature points to obtain initial 3D map points. The 3D map points have their respective corresponding feature points in the pair of frames, and the feature descriptor of each 3D map points correspond to the feature descriptor of the corresponding feature point(s) in the pair of frames. The feature descriptor of a 3D map point may be the same as the feature descriptor of the corresponding feature point from one frame that has a better quality, or from one frame that is captured at a later time, or the same as an average of the corresponding feature descriptors from both of the frames. As such, correspondences between the 2D feature points and the 3D map points may be obtained. In certain embodiments, the camera continues capturing frames regardless the step 310. In other embodiments, the camera resumes capturing frames after receiving the result from the step 310. In certain embodiments, the result of successfully constructing the initial map may or may not be feedbacked to the camera, but would be stored in a memory or storage of the device for further use. In certain embodiments, the constructed 3D map only contains feature points that corresponding to the feature points in the 2D frames. In other embodiments, the constructed 3D map may also be filled with some other points, such as calculated points of a flat surface, so that the 3D map can be viewed more vividly.

When the determination in step 307 is "Yes," the process 300 proceeds to step 311. At this time, the device matches the feature points of the current frame to the map points in the 3D map. In certain embodiments, the matching is performed on all 3D map points. In other embodiments, the matching is performed on a subset of 3D map points whose ages are less than a predetermined threshold, in order to increase its matching speed and improve performance accordingly. The matching is based on the feature descriptors, such as ORB feature descriptors of the 2D feature points or the 3D map points. In certain embodiments, the match may not mean the feature descriptors are exactly the same, but close enough.

After the matching, in step 313, the device determines the quality of the matching result obtained from step 311. In certain embodiments, the determination is performed based on whether there is a sufficient number of matched feature points. In other embodiments, the determination may further include the percentage of matched feature points in the current frame and the total number of identified feature points. A high percentage normally means a good match, a decent percentage may mean a good match with some new feature points, and a low percentage may mean a bad frame. When the matching between the current frame and the 3D map is not good enough, the method 300 discards the current frame, which may result in a bad pose, and proceeds back to step 301 for continuously capturing frames. In certain embodiments, since the camera captures frames continuously, when the determination in step 313 is "No," the device may not do anything as a response, but wait for another matching result from a subsequent frame. Thus, the results of a bad matching may not be transferred back to the step 301.

In step 315, in response to receiving the determination in step 313 as "Yes," the device computes a current pose of the camera based on the obtained correspondence and optionally or additionally based on data obtained from at least one of an accelerometer, a gyroscope, and an inertial measurement unit (IMU). In certain embodiments, the pose is calculated using a perspective-n-point algorithm followed by a bundle adjustment optimization. The current pose of the camera may be typically represented as a three degree translation and a three degree rotation. In certain embodiments, the current pose of the camera may be further optimized using BA optimization on the sliding window. The BA is a non-linear optimization approach that optimizes locations of the 3D map points and poses of the camera all together by minimizing re-projection errors of the 3D map points on camera view planes. Different from ORB-SLAM and VINS-Mono which perform the BA whenever there is a new key frame so as to correct errors in tracking the pose of the camera at regular or irregular intervals, the pose of the camera may be optimized on every frame in the embodiment of the present invention, regardless whether it is a key frame or not. In this way, the embodiment of the present invention produces optimized pose for each frame, which thus increases temporal smoothness of camera pose estimation. In an embodiment, a virtual object may be rendered on the 3D map.

In certain embodiments, the device may further perform the steps 317 and 319. In step 317, the device performs key frame test on the current frame, to decide the current frame is qualified as a key frame. In certain embodiments, if the percentage of feature points of the current frame that have been matched to the 3D map is below a threshold, the current frame may be regarded as seeing a new part of the environment, and should be added to the key frame set. In certain embodiments, the threshold is about 5-50%. In certain embodiments, the threshold is about 10-30%. In certain embodiments, the threshold is about 20%. Subsequently, in step 319, the device uses the current frame and a best frame from the sliding window to perform triangulation to reconstruct a set of new 3D map points, and adds these new points to the 3D global map. In certain embodiments, the device increases the age of all 3D map points by 1 to indicate this update. In an embodiment, 3D map points whose ages are more than a predetermined threshold may be removed, in order to save storage space.

If the device determined that high percentage of the feature points in the current frame can find corresponding map points in the 3D frame, then there is no or not much new part of the environment in the current frame. Under this situation, the current frame is not good to be a key frame, and the process continues to step 301 to capture a new frame, or just simply doesn't do anything, since the camera may have already been configured to continuously capture images anyway.

The foregoing describes the basic principle of the embodiment of the present invention as mentioned previously in detail. By matching the 2D features from the current frame directly to the 3D map points in the 3D map, independent of the correspondences between the 3D map points of the 3D map and the feature points from any of the previous frames, advantages of the method for SLAM according to the exemplary embodiment of the present invention over the conventional SLAM solutions may be achieved, as shown in FIGS. 4 and 5.

Figure 4:
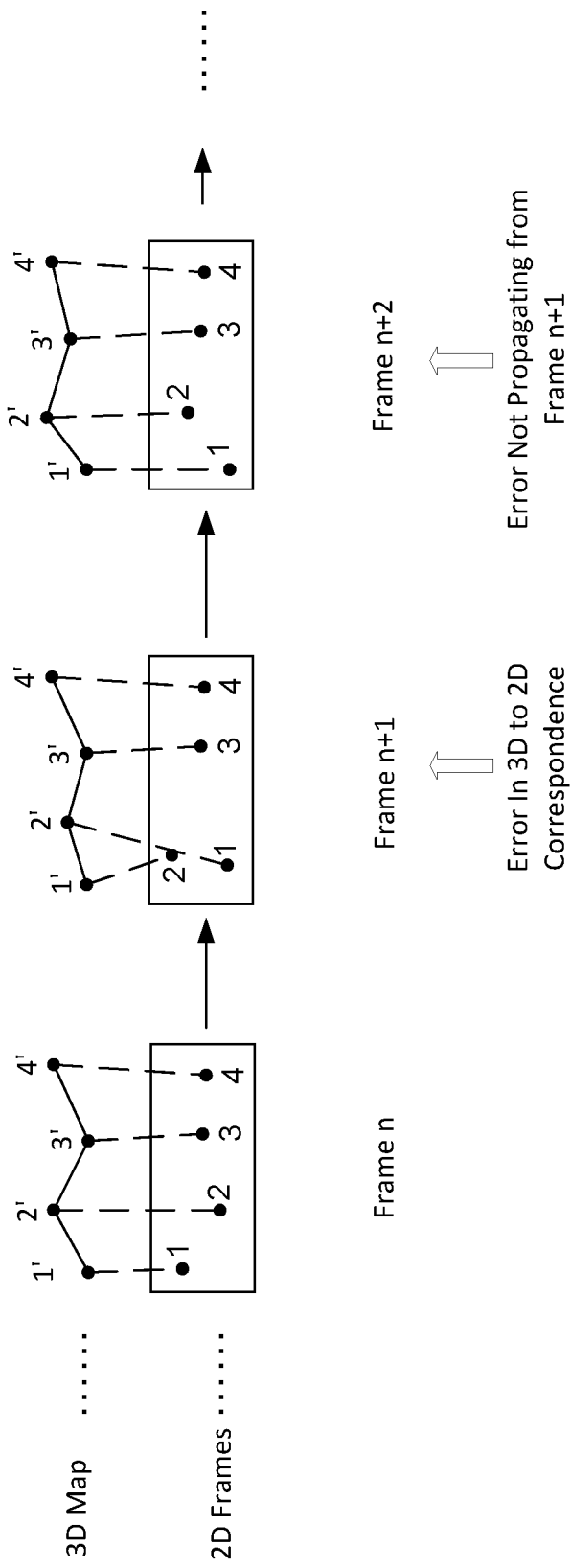
FIG. 4 schematically depicts a SLAM solution according to certain embodiments of the present invention, where error propagating is prevented.

FIG. 4 shows an advantage of the method for SLAM according to certain embodiments of the present invention over that of FIG. 1. As shown in FIG. 4, the correspondence between the feature points 1, 2, 3, and 4 in frame n and the map points 1', 2', 3', and 4' in the 3D map is correct. Although there is an error in obtaining the correspondences (1-2', 2-1', 3-3', 4-4') between the feature points 1, 2, 3, and 4 in frame n+1 and the map points 1', 2', 3', and 4' in the 3D map, the error will not be propagated to the correspondences (1-1', 2-2', 3-3', 4-4') between the feature points 1, 2, 3, and 4 in frame n+2 and the map points 1', 2', 3', and 4' in the 3D map. The reason is that each of the frames n, n+1 or n+2 independently corresponds to the 3D map. In other words, the device searches the feature points 1, 2, 3, 4 in frame n directly against the map points in the 3D map to find matches, the device searches the feature points 1, 2, 3, 4 in frame n+1 directly against the map points in the 3D map to find matches, and the device searches the feature points 1, 2, 3, 4 in frame n+2 directly against the map points in the 3D map to find matches, such that the matching error between one frame and the 3D map will not affect the matching between the other frame and the 3D map.

Figure 5:
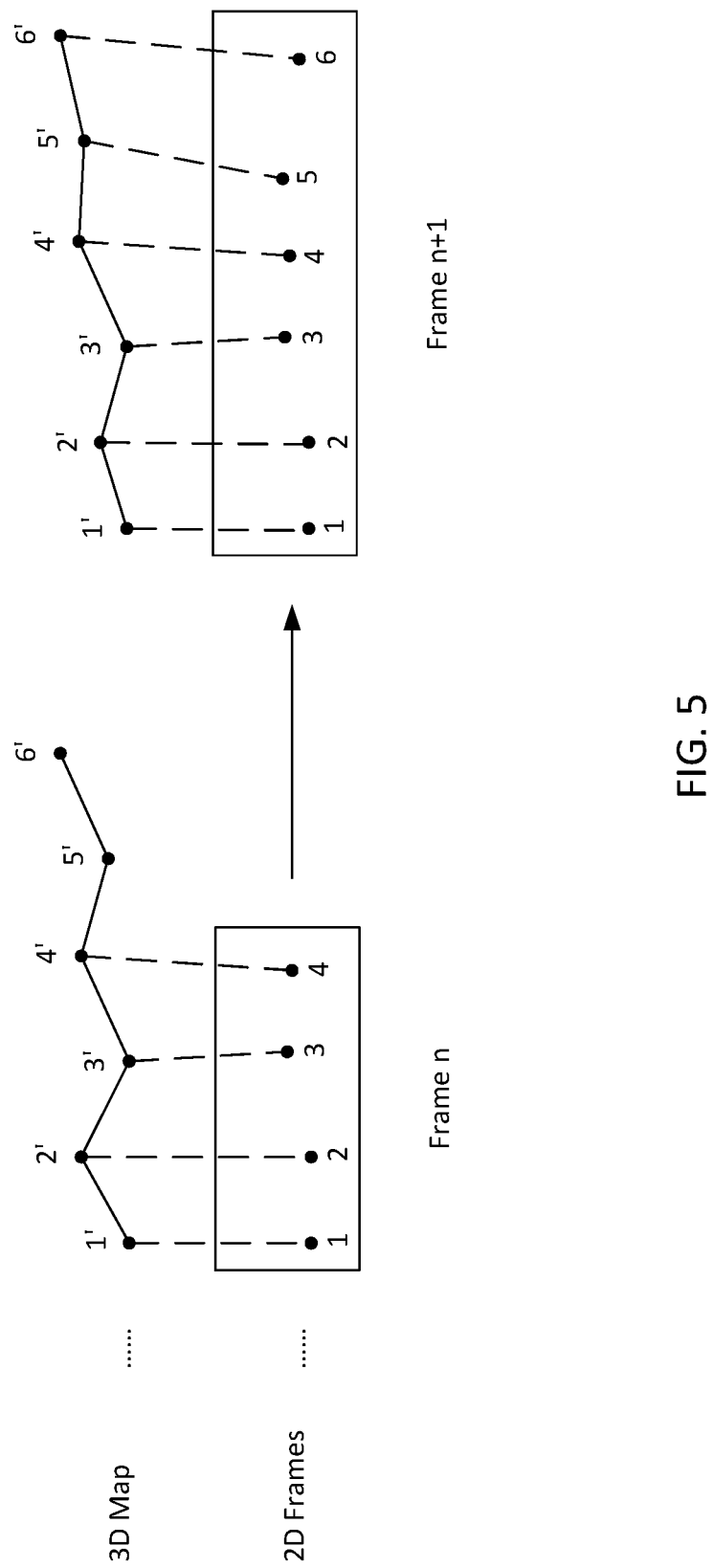
FIG. 5 schematically depicts a SLAM solution according to certain embodiments of the present invention, where extended match between 2D frames and 3D map is provided.

FIG. 5 shows another advantage of the method for SLAM according to certain embodiments of the present invention over that of FIG. 2. As shown in FIG. 5, the correspondences between the 3D map points 1', 2', 3', and 4' of the 3D map and the feature points 1, 2, 3, 4 from the current frame (frame n+1) which can perform the matching are not limited to the feature points (1, 2, 3, 4) from the previous frame (frame n) any more. When there are more feature points 5, 6 from the current frame (frame n+1), these feature points 5, 6 can find their correspondences with the 3D map points of the 3D map, because the correspondences between the 3D map points of the 3D map and the feature points from the current frame are obtained independent of the correspondences between the 3D map points of the 3D map and the feature points from the previous frame.

In certain aspects, instead of matching features from current frame to 3D map points, features from the current frame may be matched to a list of previous frames to achieve increased matching capability. Instead of replacing the feature descriptors of the 3D map points with those from the most recent camera frame, a list of feature descriptors from several previous frames may be kept; or even an "average" or "combined" or "concatenated" descriptor may be computed from these. The average, combined or concatenated descriptors may be defined as follows, where a descriptor of a feature point is exemplified as a vector of 32 elements (certainly, the vector can include 64 or other number of elements). In the example, a feature point in two frames has the first vector as the feature descriptor of that feature point in the first frame, has a second vector as the feature descriptor of that feature point in the second frame, and each of the first and second vectors is a 32-element vector. Then the average descriptor of that feature point may be defined as the average of the first vector and the second vector; the combined vector may be defined as a 32-element vector, where the first 16 elements of the combined vector are the first 16 elements of the first vector, and the second 16 elements of the combined vector are the last 16 elements of the second vector (certainly the combination could be in other forms); the concatenated vector may be defined as a 64-element vector, where the first 32 elements of the concatenated vector are the 32 elements of the first vector, and the second 32 elements of the concatenated vector are the 32 elements of the second vector. In other embodiments, the average, combined or concatenated descriptor are calculated similarly for more than two frames.

Accordingly, in certain embodiments, a method for SLAM is provided. At first, the camera captures a plurality of frames. In certain embodiments, the number of frames is in a range of 3-50. In certain embodiments, the number of frames is in a range of 10-30. In one embodiment, the number of frames is 20. The number of frames are included in a sliding window. Then feature points are detected from the frames. For a corresponding 2D feature point, which may exist in some or all of the number of frames, the feature descriptor in the corresponding frames are calculated. Then the calculated feature descriptors for the same 2D feature point from different frames may be averaged or combined or concatenated. Similarly, each specific 2D feature point is related to one 2D feature descriptor. Then the 2D feature points are matched to the 3D map points by searching using the averaged or combined or concatenated 2D feature descriptors, which results in correspondences between the 2D feature points and 3D map points. A current pose of the camera can be calculated based on the obtained correspondence.

In certain aspects, instead of directly matching the 2D feature points in a current frame to the 3D map, the 2D feature points in a current frame can also be matched to average, or combined, or concatenated feature descriptors from plurality of previous frames.

FIG. 6 illustratively shows a structure diagram of a device 600 for SLAM according to certain embodiments of the present invention. The device 600 may perform the method 300 described previously with reference to FIG. 3 as well as the method for SLAM according to other embodiments of the present invention as described previously.

As shown in FIG. 6, in certain embodiments, the device 600 includes at least one controller or processor 605 comprising e.g., any suitable Central Processing Unit, CPU, microcontroller, Digital Signal Processor, DSP, etc., capable of executing computer program instructions. The computer program instructions may be stored in a memory 607. The memory 607 may be any combination of a RAM (Random Access Memory) and a ROM (Read Only Memory). The memory 607 may also comprise persistent storage, which, for example, can be any single one or combination of magnetic memory, optical memory, or solid state memory or even remotely mounted memory. The device 600 may further comprise a camera 601 and a communication interface 603 arranged for communication with other devices. The instructions which, when executed by the at least one processor 605, cause the device 600 to perform the method 300 as previously described.

In a further aspect, the present invention is related to a non-transitory computer readable medium storing computer executable code. The code, when executed at least one processor 605 of a device 600/600', may perform the method 300 as well as the method for SLAM according to another exemplary embodiment of the present invention as described above. In certain embodiments, the non-transitory computer readable medium may include, but not limited to, any physical or virtual storage media. In certain embodiments, the non-transitory computer readable medium may be implemented as the memory 605 of the device 600/600' as shown in FIG. 6.

In summary, certain embodiments of the present invention, among other things, have the following advantages over related art.

First, the feature points in each 2D frame is characterized by a feature descriptor, and the 3D map stores feature descriptor of the 3D map points. By matching feature points in each of the 2D frame directly and independently to the 3D map points using feature descriptors, the matching error between each 2D frame and the 3D map will not accumulate to the following 2D frames. Further, instead of calculating pose of the camera using the correspondence between two 2D frames, the pose of the camera corresponding to each frame can be calculated based on the correspondence between the 2D frame and the 3D map, which makes the calculation of the camera pose more accurately.

Secondly, the 3D map points are provided with a parameter of age. When matching feature points in a 2D frame to 3D map points, the 3D map points to be matched can be limited by the age. In this way, the feature points in the 2D frame will be searched against a subset of the 3D map points, such as the most recent sets of 3D map points. The search against the recent sets of 3D map points is much faster than search against all of the 3D map points.

Thirdly, certain embodiments of the present invention optimize the pose by BA for each frame. As a result, the poses of the camera can be estimated more accurately, and the change of the pose is smooth.

Further, the sliding window or the buffer contains a certain number of frames, such as 10-30 frames, which can all be used in the optimization of the pose.

In certain embodiments, the device of the present invention includes a smart phone, a tablet, a computer, a drone, a robot, or the like, and the environment includes an indoor environment such as a ware house, or an outdoor environment. In certain embodiments, other applications can be combined with the accurate reconstruction of the 3D map and the calculation of the pose of the camera. For example, a virtual object can be placed in a definite location of the 3D map, so that the effect of having the object in the real environment can be evaluated. In certain embodiments, the present invention only requires one camera to achieve the above discussed advantages. In other embodiments, two or more cameras can be used with minor revision of the method and device.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

1. R. MUR-ARTAL, J. M. M. MONTIEL AND J. D. TARDOS, ORB-SLAM: a versatile and accurate monocular SLAM System, IEEE Transactions on Robotics, October 2015, 1147-1163, Vol. 31, No. 5.
2. TONG QIN, PEILIANG LI, ZHENFEI YANG, SHAOJIE SHEN, VINS-Mono: A robust and versatile monocular visual-inertial state estimator, August 2017, 1-17, arXiv: 1708.03852.

What is claimed is:

1. A method for simultaneous localization and mapping, comprising:
   detecting two-dimensional (2D) feature points from a current frame captured by a camera;
   matching the 2D feature points from the current frame directly to three-dimensional (3D) map points in a 3D map independently of correspondence between the 3D map points and 2D feature points from any frames previous to the current frame, so as to obtain correspondence between the 2D feature points from the current frame and the 3D map points;
   computing a current pose of the camera based on the obtained correspondence; and
   in response to determining that the current frame qualifies as a key frame: reconstructing new 3D map points based on the current frame, and incorporating the new 3D map points to the 3D map,
   wherein each of the 2D feature points and the 3D map points has a feature descriptor, and the matching is performed by comparing the feature descriptors of the 2D feature points and the feature descriptors of the 3D map points.

2. The method according to claim 1, wherein the current frame is determined to qualify as a key frame when a percentage of 2D feature points of the current frame that have been matched to the 3D map points is below a predetermined threshold.

3. The method according to claim 2, wherein the predetermined threshold is a value between 5% and 50%.

4. The method according to claim 1, further comprising, in response to determining that the current frame qualifies as a key frame:
   respectively increasing ages of the 3D map points in the updated 3D map by 1.

5. The method according to claim 4, wherein the matching is performed on at least a part of the 3D map points whose ages are less than a predetermined threshold.

6. The method according to claim 4, further comprising:
   removing 3D map points whose ages are more than a predetermined threshold.

7. The method according to claim 1, further comprising:
   rendering a virtual object on the 3D map based on the current frame.

8. The method according to claim 1, further comprising:
selecting a pair of frames from a sequence of frames captured by the camera based on predetermined criteria; and
constructing an initial 3D map by: matching 2D feature points from the pair of frames to obtain pairs of 2D feature points, recovering relative rotation and translation of the camera based on the pairs of 2D feature points, and triangulating the pair of 2D feature points to obtain the initial 3D map points.

9. The method according to claim 1, further comprising computing the current pose of the camera based on data obtained from at least one of:
an accelerometer;
a gyroscope; and
an inertial measurement unit (IMU).

10. The method according to claim 1, further comprising optimizing the current pose of the camera by bundle adjustment.

11. The method according to claim 1, wherein each of the feature descriptors of the 2D feature points comprises a vector or a histogram of a corresponding one of the 2D feature points, and each of the feature descriptors of the 3D map points comprises a vector or a histogram of a corresponding one of the 3D map points.

12. A device for simultaneous localization and mapping, comprising a camera, at least one processor, and a memory including instructions which, when executed by the at least one processor, cause the device to:
detect two-dimensional (2D) feature points from a current frame captured by the camera;
match the 2D feature points from the current frame directly to three-dimensional (3D) map points in a 3D map independently of correspondence between the 3D map points and 2D feature points from any frames previous to the current frame, so as to obtain correspondence between the 2D feature points from the current frame and the 3D map points;
compute a current pose of the camera based on the obtained correspondence; and
in response to determining that the current frame qualifies as a key frame: reconstruct new 3D map points based on the current frame, and incorporate the new 3D map points to the 3D map,
wherein each of the 2D feature points and the 3D map points has a feature descriptor, and the matching is performed by comparing the feature descriptors of the 2D feature points and the feature descriptors of the 3D map points.

13. The device according to claim 12, wherein the instructions which, when executed by the at least one processor, further cause the device to determine that the current frame qualifies as a key frame when a percentage of 2D feature points of the current frame that have been matched to the 3D map points is below a predetermined threshold having a value between 5% and 50%.

14. The device according to claim 12, wherein the instructions which, when executed by the at least one processor, further cause the device to, in response to determining that the current frame qualifies as a key frame:
respectively increase ages of the 3D map points in the updated 3D map by 1; and
remove 3D map points whose ages are more than a predetermined threshold.

15. The device according to claim 12, wherein the instructions which, when executed by the at least one processor, further cause the device to:
select a pair of frames from a sequence of frames captured by the camera based on predetermined criteria; and
construct an initial 3D map by: matching 2D feature points from the pair of frames to obtain pairs of 2D feature points, recovering relative rotation and translation of the camera based on the pairs of 2D feature points, and triangulating the pair of 2D feature points to obtain initial 3D map points.

16. The device according to claim 12, wherein each of the feature descriptors of the 2D feature points comprises a vector or a histogram of a corresponding one of the 2D feature points, and each of the feature descriptors of the 3D map points comprises a vector or a histogram of a corresponding one of the 3D map points.

17. The device according to claim 12, wherein the instructions which, when executed by the at least one processor, further cause the device to: optimize the current pose of the camera by bundle adjustment.

18. A non-transitory tangible computer readable medium which stores computer program comprising instructions which, when executed on at least one processor, cause the at least one processor to perform the method according to claim 1.

* * * * *